United States Patent Office 2,766,299
Patented Oct. 9, 1956

2,766,299

PROCESS OF PREPARING LIQUID POLYMERIZATION PRODUCTS FROM FLUOROCHLOROALKENES AND HALOALKANES

Rudolf Schäff, Frankfurt am Main Hochst, Germany, assignor to Farbwerke Hoechst Aktiengesellschaft vormals Meister Lucius und Bruning, Frankfurt am Main, Germany, a company of Germany No Drawing. Application May 7, 1952,
Serial No. 286,633

Claims priority, application Germany May 15, 1951

6 Claims. (Cl. 260—653)

The present invention relates to a process of preparing liquid polymerization products.

It is known that ethylenes containing fluorine and chlorine as substituents can be converted into solid products by polymerization reaction. For this purpose, the monomeric compounds which generally have a low boiling point are polymerized in an autoclave at 20° C.–100° C. in the presence or absence of water, emulsifying agents, and other additions. The special advantages of such polymers are their extremely high softening point and their excellent stability to chemical agents.

Now, I have found that polymerization products of a substantially different kind are obtained by subjecting ethylenes containing fluorine and chlorine as substituents in the gaseous state to a higher temperature, namely a temperature within the range of about 150° C. and about 450° C., and preferably about 300° C. and about 400° C. It is of advantage to pass the monomer through a tube heated to the desired temperature. The unreacted monomer may be reintroduced in a cyclic process.

The polymerization is assisted by carrying it out in the presence of halogen compounds which decompose at the reaction temperatures, with formation of radicals. For this purpose halogens, for example chlorine, are suitable. The dissociation into radicals may, of course, be further promoted by exposure to light. Halogenated carbon compounds, such as carbon tetrachloride or substances capable of undergoing disproportionation into halogen containing compounds and halogens may be used instead of or in addition to halogens. There may be mentioned, more especially bromine, iodine, hexachlorethane, carbon tetrabromide, trichloro-fluoromethane, dichloro-difluoromethane, $CF_2Cl$—$CFCl_2$, $CFCl=CF_2$, $CCl_2=CF_2$, $CClF=CClF$, and $CFCl=CCl_2$, furthermore halogen compounds containing hydrogen such as $CHCl_3$, $CH_2Cl_2$, $CH_3Cl$, $C_2H_5Cl$, $CHCl=CHCl$, $CCl_2=CH_2$, $CFCl=CH_2$, that is to say, above all halogens and halogenated aliphatic hydrocarbons containing 1 to 2 carbon atoms. As mentioned above, the monomeric compounds which are labile when heated and begin to decompose at the temperature of polymerization, can also be reacted alone without the addition of other halogen containing compounds if a sufficiently high temperature is used. The reaction may also be carried out in the presence of a filler such as silica gel or activated carbon, and an inorganic halogen compound such as copper chloride precipitated on a carrier.

When another substance of the aforesaid kind capable of decomposing with the formation of radicals is added to the fluoro-chloro-substituted ethylenes to be polymerized, the portion of the added substance should be about 0.1 to about 10 mol percent calculated on the monomer to be polymerized.

The temperature may vary within wide limits. Low boiling monomers polymerize at about 150° C. However, as the polymerization is carried out in the gaseous phase the temperatures must be above the boiling point of the monomer at the pressure prevailing in the apparatus, advantageously above the critical temperature. The upper temperature limit is only that at which carbonization of the monomer occurs. Generally, therefore temperatures above about 450° C. will not be used.

As the polymerization sets in quickly a reaction period of about $\frac{1}{10}$ second suffices. The maximum reaction period is limited only by considerations of economy and by the inception of decomposition at very high temperatures.

As monomers there may be used, for example: $CF_2=CFCl$, $CFCl=CFCl$, $CF_2=CCl_2$, $CH_2=CFCl$, $CHF=CFCl$, $CF_2=CHCl$ or $CCl_2=CFCl$.

The polymerization may be carried out at atmospheric or superatmospheric pressure, and preferably at the vapour pressure of the monomer at the polymerization temperature used. For example, pressures up to 500 atmospheres are suitable.

The saturated, low-molecular polymerization products of fluoro-chloro-substituted ethylenes easily obtainable by the process of the invention are suitable, for instance, as liquid dielectrics, as special lubricants for use under corrosive conditions, as heating or cooling liquids highly resistant to temperature changes, and for other purposes where chemical and thermal resistance are required. Furthermore, they can be used as solvents and plasticizers for the known polymers of high molecular weight hereinbefore referred to.

By the method described in this Example there are obtained, depending on the relative proportions of the monomer and halogen, the temperature used and the rate of flow through the reaction tube, thinly to thickly liquid distillable oils or highly viscous to waxy polyers, which may contain the distillable components admixed therewith.

The following example serves to illustrate the invention, but it is not intended to limit it thereto.

*Example*

A mixture of trifluoro-chlorethylene and about 0.5–1 mol percent of chlorine is passed for 30 hours through a glass reaction tube heated at 350° C., at the rate of about 20 liters per hour, and is cooled on leaving the tube. After separation of about 1500 grams of unreacted monomer, the following fractions are obtained by distillation:

About 30 grams boiling at about 48° C., liquid
About 50 grams boiling up to 200° C., liquid
About 50 grams boiling up to 350° C., liquid
And about 10 grams boiling above 350° C., waxy As by this process no groups containing hydrogen are introduced into the polymeric molecule, the resulting products are as stable to heat as the solid polytrifluorochlorethylene of high molecular weight.

These and other polymerizations are advantageously carried out in a cyclic process. For this purpose it is of advantage to isolate the polymers contained in the reaction gases, for example by cooling, and to reintroduce the unreacted monomer into the polymerization vessel after addition of fresh monomer. When the reaction is carried out in the presence of halogen or halogen compound, fresh quantities thereof are added, pari passu with their consumption, to the monomer before it is reintroduced into the polymerization vessel.

I claim:

1. The process for polymerizing unsaturated ethylenes containing both fluorine and chlorine, which comprises subjecting to a temperature between about 150° C. and about 450° C. a gaseous mixture consisting of said unsaturated ethylenes and a member selected from the group consisting of chlorine, bromine, iodine and unstable halogen substituted hydrocarbon which decomposes to form free radicals at the prevailing temperature.

2. The process for polymerizing unsaturated ethylenes containing both fluorine and chlorine, which comprises subjecting to a temperature between about 150° C. and about 450° C. a gaseous mixture consisting of said unsaturated ethylenes and about 0.1 to 10 percent (calculated upon the monomeric unsaturated ethylene) of a member selected from the group consisting of chlorine, bromine, iodine and an unstable halogen substituted hydrocarbon which decomposes to form free radicals at the prevailing temperature.

3. The process for polymerizing trifluorchlorethylene, which comprises subjecting to a temperature between about 150° C. and about 450° C. a gaseous mixture consisting of said trifluorchlorethylene and a member selected from the group consisting of chlorine, bromine, iodine and an unstable halogen substituted hydrocarbon which decomposes to form free radicals at the prevailing temperature.

4. The process for polymerizing trifluorchlorethylene, which comprises subjecting to a temperature between about 150° C. and about 450° C. a gaseous mixture consisting of said trifluorchlorethylene and about 0.1 to 10 mol percent (calculated upon the monomeric trifluorchlorethylene) of a member selected from the group consisting of chlorine, bromine, iodine and an unstable halogen substituted hydrocarbon which decomposes to form free radicals at the prevailing temperature.

5. The process for polymerizing trifluorchlorethylene which comprises subjecting to a temperature between about 300° C. and about 400° C. a gaseous mixture consisting of said trifluorchlorethylene and about 0.5 to 1 mol percent (calculated upon the monomeric trifluorchlorethylene) of chlorine.

6. The process for polymerizing unsaturated ethylenes containing both fluorine and chlorine, which comprises subjecting to a temperature between about 150° C. and about 450° C. a gaseous mixture consisting of said unsaturated ethylenes and about 0.1 to 10 mol percent (calculated upon the monomeric unsaturated ethylene) of a halogen compound selected from the group consisting of chlorine, bromine, iodine and an unstable halogen substituted hydrocarbon which decomposes to form free radicals at the prevailing temperature, separating the polymerization products from the reaction gases and recycling the unchanged monomer and halogen compound after adding fresh monomer and halogen compound.

References Cited in the file of this patent

UNITED STATES PATENTS

| | | |
|---|---|---|
| 2,566,163 | Calfee | Aug. 28, 1951 |
| 2,582,283 | Sachanen | Jan. 15, 1952 |
| 2,602,824 | Padbury et al. | July 8, 1952 |
| 2,606,937 | Calfee et al. | Aug. 12, 1952 |
| 2,614,131 | Simons et al. | Oct. 14, 1952 |
| 2,636,907 | Miller | Apr. 28, 1953 |
| 2,694,701 | Blum et al. | Nov. 16, 1954 |

FOREIGN PATENTS

| | | |
|---|---|---|
| 926,601 | France | Apr. 21, 1947 |